Dec. 19, 1939. H. MEISSL 2,183,970
SOIL MOISTENING DEVICE
Filed Feb. 6, 1937
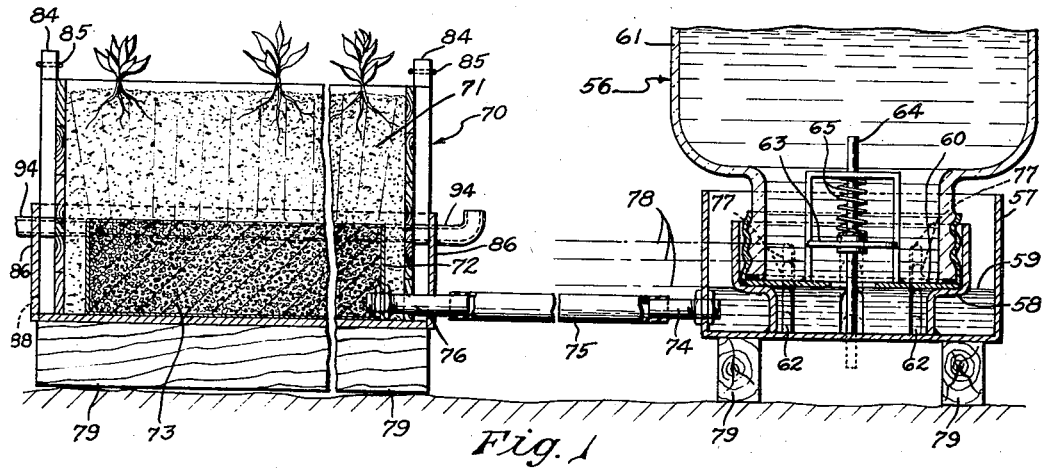
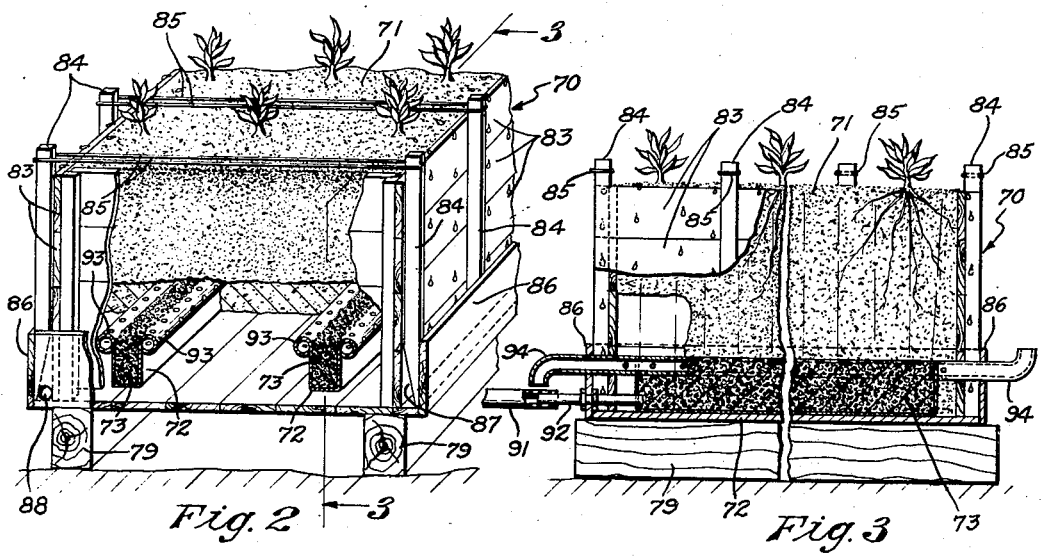
INVENTOR
Hugo Meissl
BY
Wooster Davis
ATTORNEYS.

Patented Dec. 19, 1939

2,183,970

UNITED STATES PATENT OFFICE 2,183,970

SOIL MOISTENING DEVICE

Hugo Meissl, Oakville, Conn.

Application February 6, 1937, Serial No. 124,432

8 Claims. (Cl. 47—38)

This invention relates to new and useful improvements in moistening devices for potted or boxed plants, seeds, slips, small shrubs and the like, either in the home, green house, or out of doors.

An object of the invention is to provide means whereby the soil in a pot, or box, or bench or the like may be kept moist to the desired extent and whereby such soil is aerated and kept in the proper condition for the giving of the best results.

Another object is to provide a device of the kind indicated and wherein the moistening or watering is automatically accomplished, a suitable source of supply of water being provided together with means whereby over an extended period of time and in the desired quantities water from said source is supplied to the soil being treated.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a sectional view showing a water feed means and a wick construction;

Fig. 2 is a perspective view showing the box construction of Fig. 1; and

Fig. 3 is a sectional view taken as along the line 3—3 in Fig. 2.

In this device 70 indicates a box-like container mounted on supports 79 and substantially filled with soil 71 for the growing of a large number of plants. In the lower portion of the container 70 is one or more trough-like devices 72 of rigid construction, preferably metal, and each of which is filled with sand or other material 73 forming a wick. Water from the fountain device 56 is supplied to the interior of the trough 72 and the sand or other wick material 73 therein comprises a wick for the spreading of such water and the feeding of it to the soil. This may be used for large or small installations.

For the conveying of water from the pan 57 to the trough 72 a nipple 74 communicating with the interior of the pan is connected by a hose or pipe 75 with a nipple 76 communicating with the interior of the trough. The dotted lines 77 in Fig. 1 indicate the use of rings 58 of various heights having openings 62 of various heights therein. The broken lines 78 indicate the various levels the water will reach in the pan 57 and trough 72 with the various heights of rings 58. Suitable drain openings are provided for the escape of surplus rain water.

Figs. 2 and 3 are other views of the arrangement of Fig. 1 which is suitable for use in green houses and the like or large installations. Mounted on the supports is the box or trough-like container 70 substantially filled with soil 71 for the growing of plants and the like. The side boards 83 of the container are held in place by means of stakes 84 the upper ends of which are tied together by wires 85. Boards 86 are arranged against the lower outer edges of the stakes 84 and the lower portions of such stakes are cut away as at 87 whereby the boards 86 help define channels through which water overflowing from the top of the soil in the container is carried to the ends of the containers and there drained out through suitable openings 88.

In the lower portion of the container under the soil therein the troughs 72 are arranged in the required number. The troughs are filled with sand or other wick material 73 to function as wicks and water from any suitable source is, through a pipe or hose 91, supplied to the sand 73 through suitable nipples 92. The supply of water may be from one of the funtain-like devices 56 so that the water in the troughs may be kept at the desired level.

Associated with the troughs 72 are perforated tubes 93 extending into the soil 71 along the troughs and these tubes may in fact be formed at the edges of the troughs either as separate tubes or by rolling over the edges of the troughs. Suitable extensions 94 on the ends of the tubes 93 are carried through the walls of the containers so that the ends of the tubes are in communication with the outside air and these tubes provide means for the circulation of air into contact with the soil 71 so as to keep the same sweet and in the proper condition for best results for the growing of plants.

It will be seen from the above that this device will supply to the soil a constant and uniform supply of moisture, preventing the soil from becoming too moist or too dry. This gives constant and uniform growth to the plants as they have throughout their growing season a uniform and adequate supply of moisture. It has a special advantage in sprouting seeds as they can be kept from drying out or getting too moist. It is also a very excellent means of propagating cuttings as here a steady moisture supply is paramount to good results.

Any desired chemical or plant food can be added to the water, and as there is no drainage there is no loss of this food.

It will be obvious that this device is a great labor saver, a water and plant food saver, and a great improvement toward insuring successful growth of the plants to their maturity. It can also be of great usefulness in storing up water during rainy weather and then using it for plant growth or soil moistening purposes during a drought or dry periods, or periods of reduced rain supply. It could also be used for growing flowers, vegetables, and small fruits in dry areas otherwise unsuited for such plant growth. It is invaluable for sprouting seeds in the green house, or hot bed, or in the house, as the seed can be kept from drying out and the soil kept at the proper moisture content for best germination of the seed.

Having thus set forth the nature of my invention, what I claim is:

1. In a soil moistening device, a box of soil for the growth of plants, a trough in the lower portion of said box, means for supplying water to said trough, and wick material in said trough and in contact with the soil for the spreading and feeding of said water to the soil.

2. In a soil moistening device, a box of soil for the growth of plants, a trough in the lower portion of said box, means for supplying water to said trough, wick material in the trough and in contact with the soil for the spreading and feeding of said water to the soil, and means controlling the height to which the water will be fed to the trough.

3. In a soil moistening device, a box of soil for the growth of plants, a trough in the lower portion of said box, means for supplying water to the trough, wick material in the trough and in contact with the soil for the spreading and feeding of said water to the soil, a perforated air tube in the soil extending longitudinally of and adjacent the trough, and said air tube extending to the outer side of said box.

4. In a soil moistening device, a container for soil, one or more elongated troughs in the lower portion of the container, wick material in the troughs and in contact with the soil for spreading and feeding water to the soil, means for supplying water to the wick material, and means extending longitudinally of the troughs and adjacent thereto within the soil to supply air circulation to the soil.

5. In a soil moistening device, a container for soil, an elongated trough in the lower portion of the container, wick material in the trough and in contact with the soil for spreading and feeding water to the soil, means for supplying water to the wick material, a conductor extending longitudinally of the trough adjacent thereto within the soil and having discharge openings to permit circulation of air to the soil, and said conduit being connected with the outer air to permit air circulation through the conduit to the soil.

6. In a soil moistening device, a container for soil, an elongated trough in the lower portion of the container extending for the greater portion of the length thereof, wick material in the trough and in contact with the soil for spreading and feeding water to the soil, means for feeding water to the wick material, conduits extending along the sides of the trough adjacent the top thereof and having openings for circulation of air to the soil, and said conduits being connected with the outer air at their ends to permit circulation of air to the soil.

7. In a soil moistening device, a container for soil having upright side walls, an elongated trough in the lower part of the container extending for the greater portion of the length thereof, wick material in the trough and in contact with the soil for feeding water to the soil, means for supplying water to the wick material, upright walls spaced outwardly from the first walls forming channels to receive overflow of water from the top of the soil over the first mentioned walls, and means for draining the water from said channels.

8. In a soil moistening device, a container for soil, an elongated trough in the lower portion of the container and extending for the greater portion of the length thereof, means for supplying water to the trough and maintaining it at a substantially constant level therein, and wick material in the trough and in contact with the soil for spreading and feeding the water to the soil throughout the length of the trough.

HUGO MEISSL.